INVENTOR.
WILLIAM W. CAMP
BY Denny and Denny
HIS ATTORNEYS.

CIRCUIT BREAKER MECHANISM

Filed Jan. 28, 1966 5 Sheets-Sheet 2

INVENTOR.
WILLIAM W. CAMP
BY Denny and Denny
HIS ATTORNEYS.

INVENTOR.
WILLIAM W. CAMP
BY Denny and Denny
HIS ATTORNEYS.

July 4, 1967 W. W. CAMP 3,329,913

CIRCUIT BREAKER MECHANISM

Filed Jan. 28, 1966 5 Sheets-Sheet 4

INVENTOR.
WILLIAM W. CAMP
BY Denny and Denny
HIS ATTORNEYS.

CIRCUIT BREAKER MECHANISM

Filed Jan. 28, 1966

INVENTOR.
WILLIAM W. CAMP
BY Denny and Denny
HIS ATTORNEYS.

United States Patent Office 3,329,913

Patented July 4, 1967

3,329,913

CIRCUIT BREAKER MECHANISM

William W. Camp, Lawrenceville, N.J., assignor to Heinemann Electric Company, Trenton, N.J., a corporation of New Jersey Filed Jan. 28, 1966, Ser. No. 523,729

12 Claims. (Cl. 335—38)

This invention relates to electric circuit breakers comprising an electromagnetic tripping device and a linkage mechanism which includes an overcenter, automatically resettable toggle mechanism.

It is an object of this invention to provide an electromagnetic tripping device and a linkage mechanism having features which provide a compact arrangement of smaller size, and which reduce the cost of the circuit breaker, compared with previous similar constructions of prior circuit breakers for similar current and voltage ratings.

The foregoing and other objects of the invention, the principles of the invention, and the best mode in which I have contemplated applying such principles will more fully appear from the following description and accompanying drawings in illustration thereof.

Figure 1:
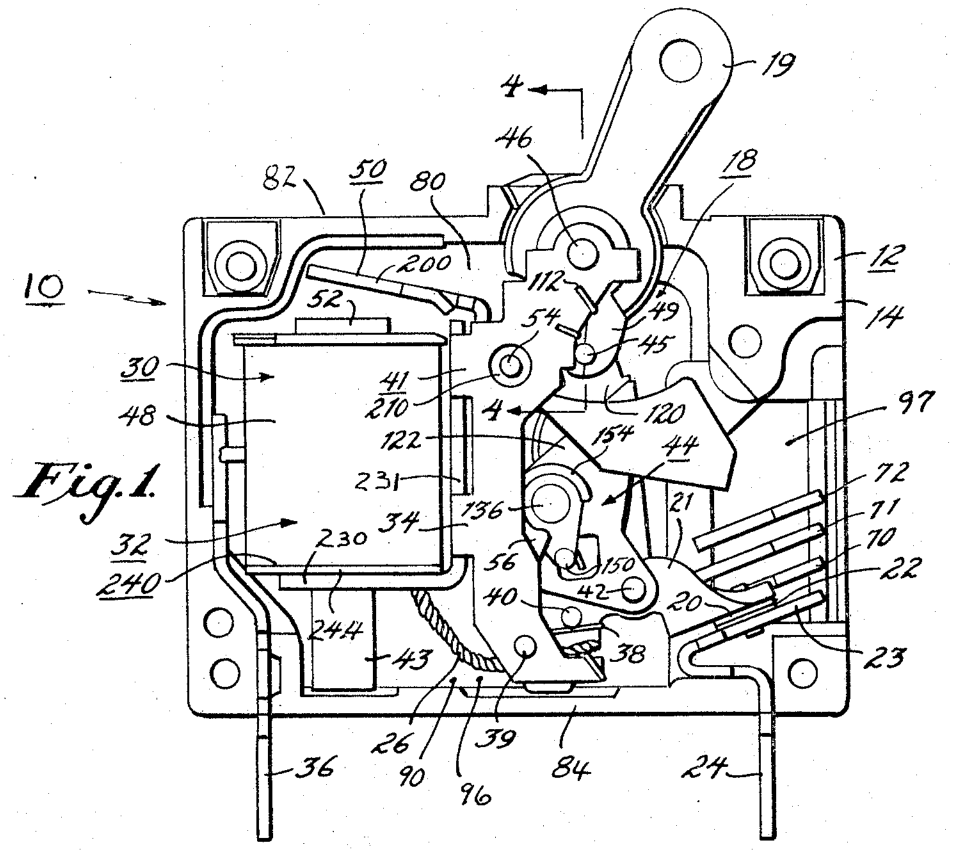
FIG. 1 is a side elevation view of a circuit breaker incorporating the invention, one of the half-cases of the circuit breaker being removed to show the internal parts of the circuit breaker, the contacts being shown in the closed position.
Figure 4:
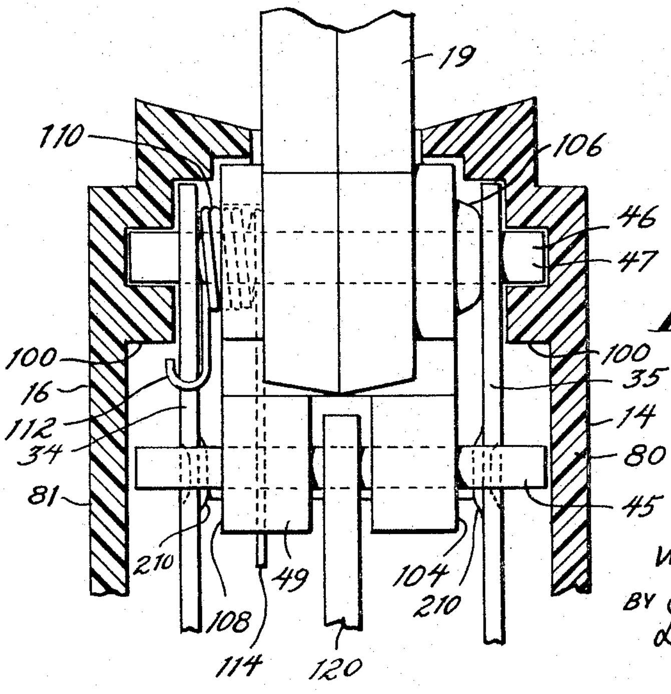
Figure 2:
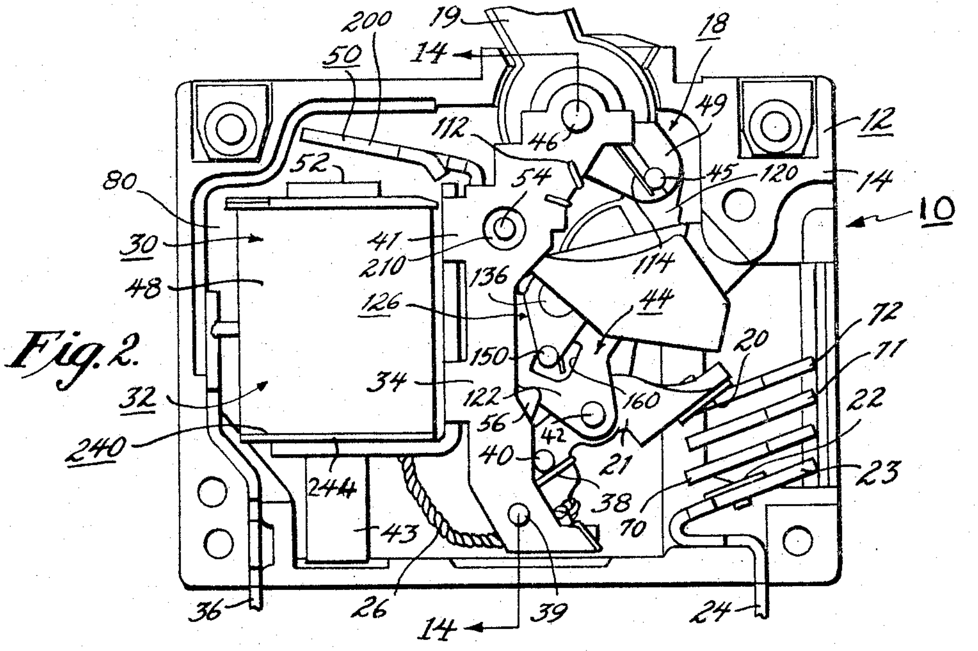
FIG. 2 is a view similar to FIG. 1, but the contacts are shown in the open position.
Figure 3:
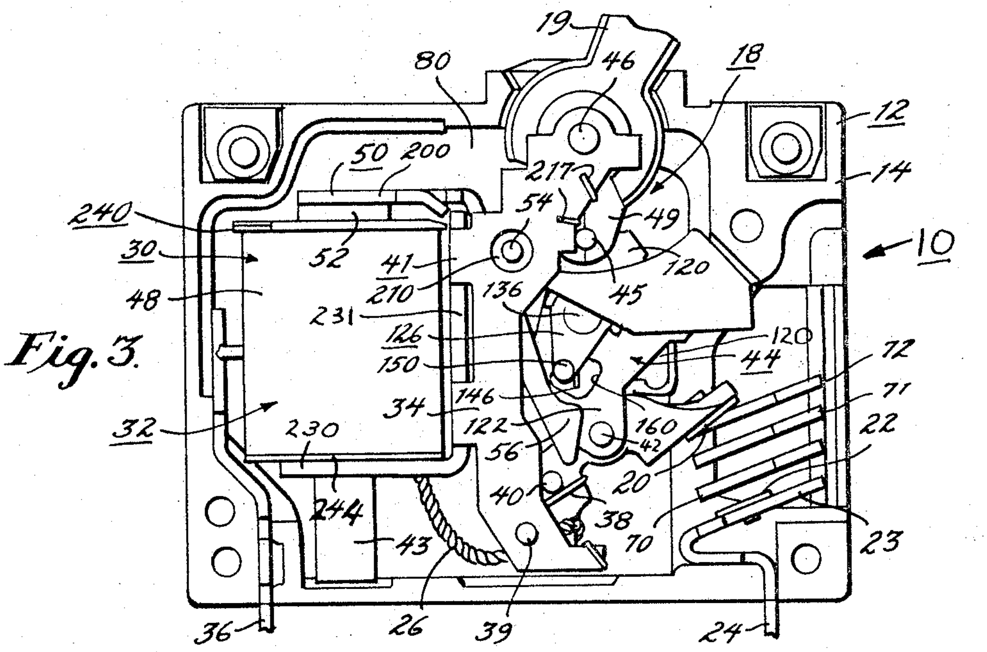
Figures 5, 6, 7:
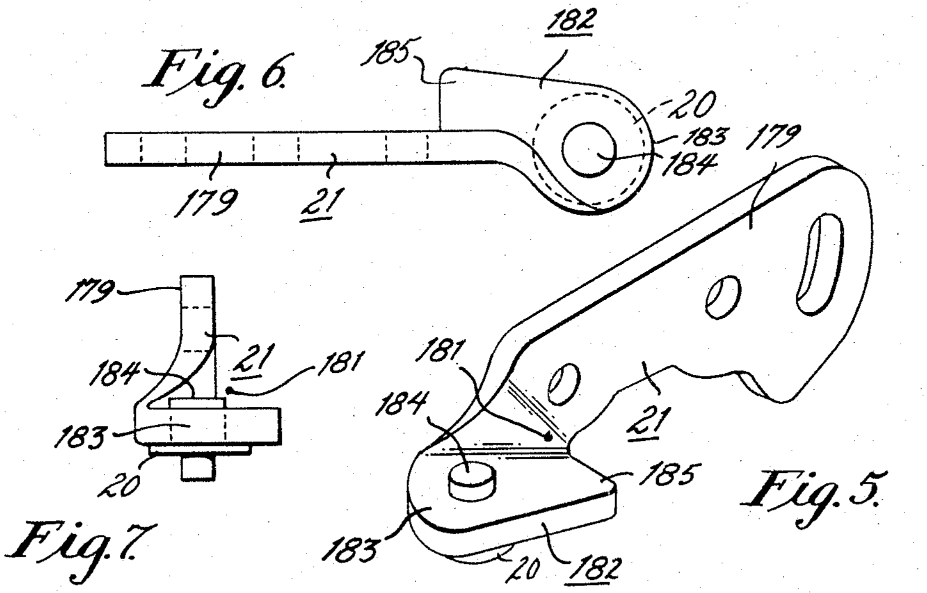
Figure 8:
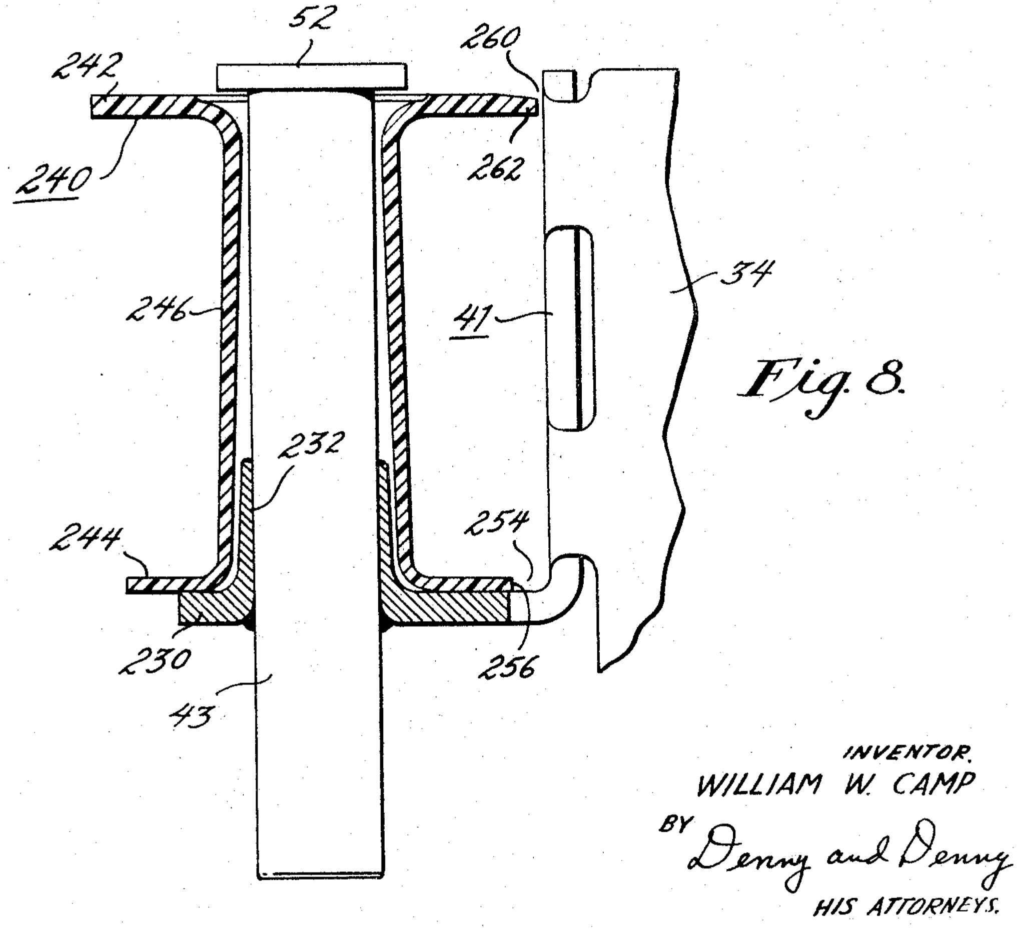
Figures 9, 10, 11, 12, 13:
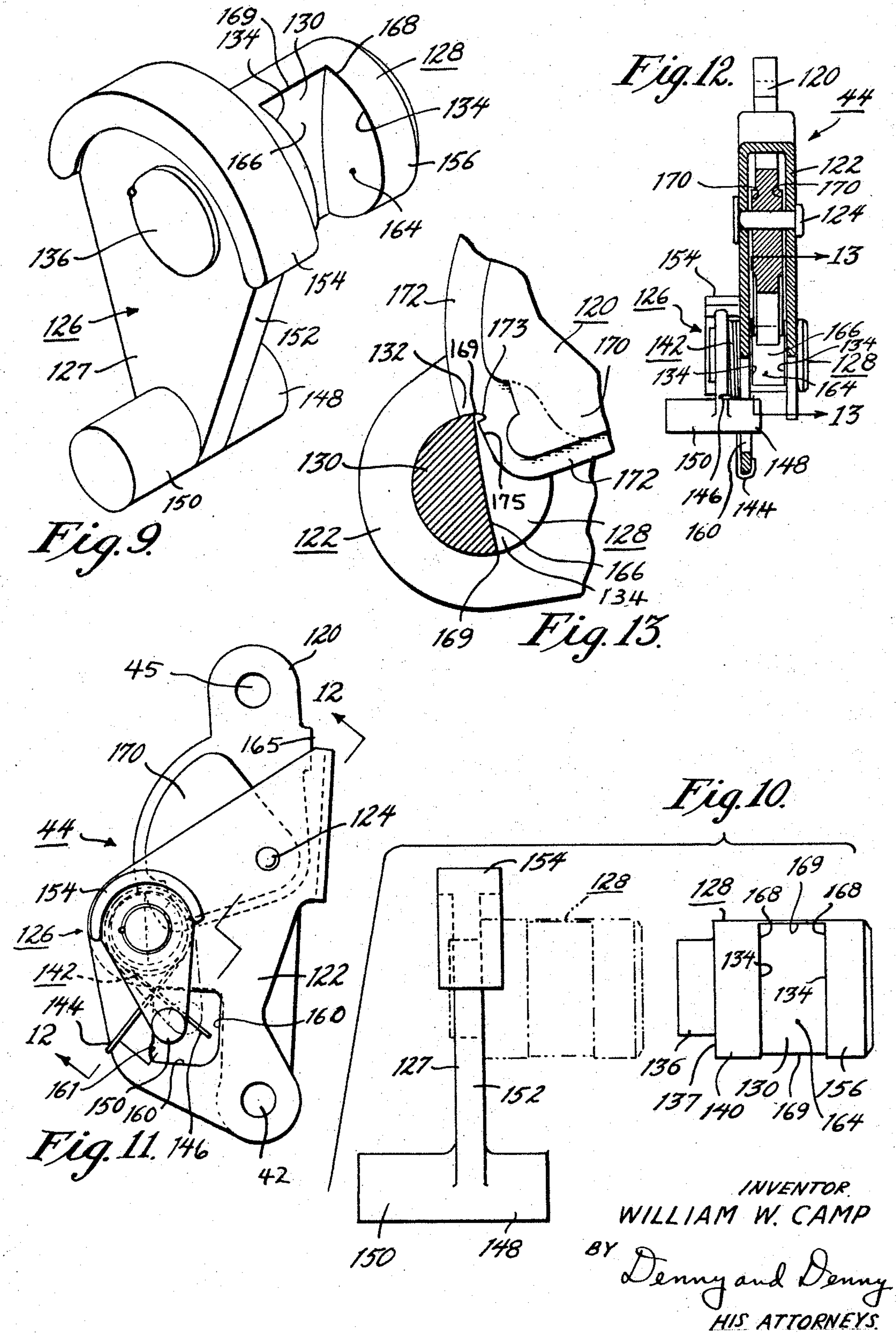
Figures 14, 15, 16, 17, 18:
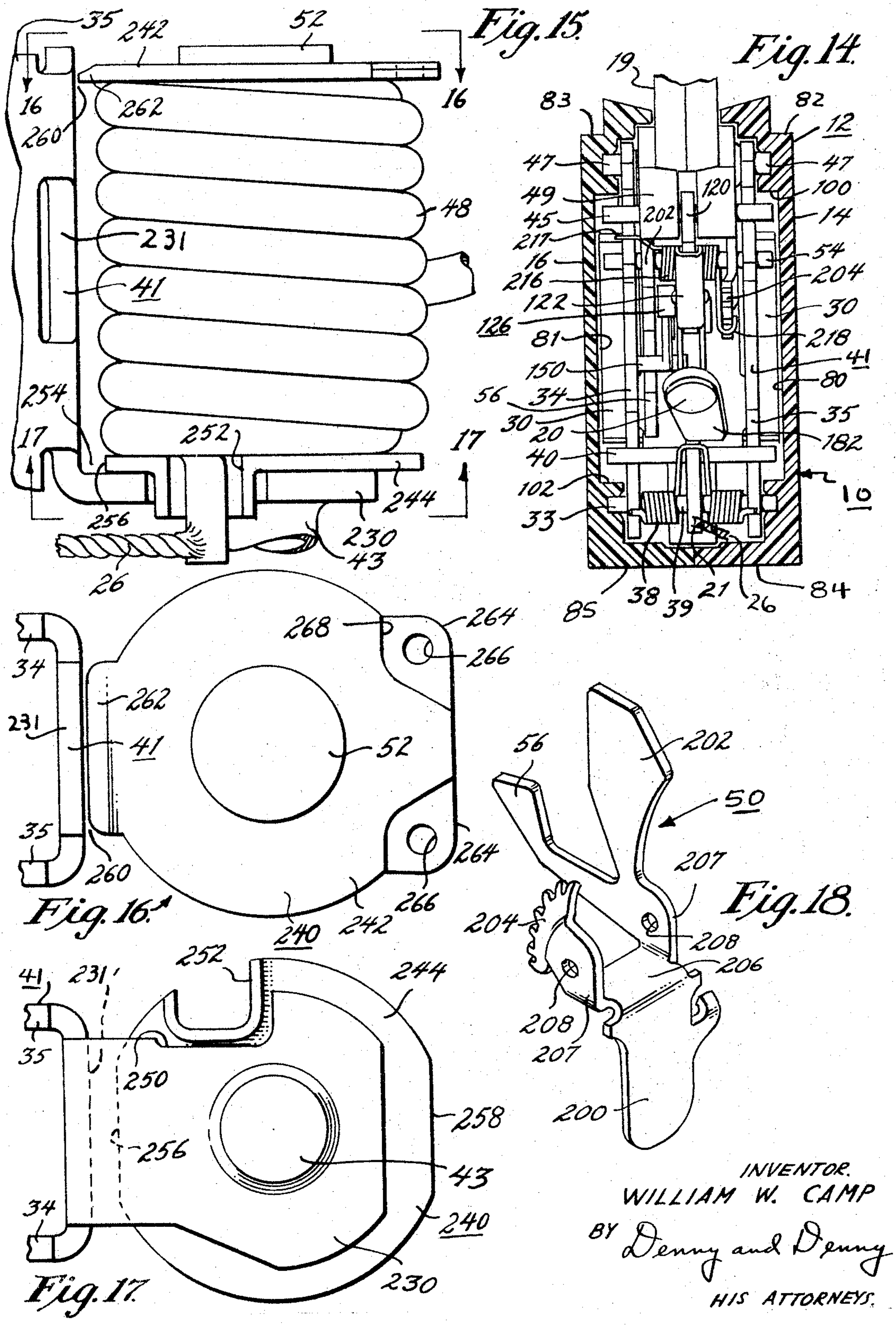

FIG. 3 is a view similar to FIG. 1 but showing the trip-free position, i.e., the coil has been energized sufficiently to pivot the armature against the pole piece, the handle is held in the "on" position of the contacts, and the toggle mechanism has collapsed and the contacts are open, the armature being shown in its attracted position it being understood that on deenergization of the coil the armature automatically returns to the position shown in FIGS. 2 and 3;

FIG. 4 is a partial sectional view taken along the line 4—4 in FIG. 1 and enlarged relative to FIG. 1, the handle and the internal parts being shown in end elevation;

FIG. 5 is a perspective view of the movable contact arm illustrated in FIGS. 1 to 3, but at an enlarged scale;

FIG. 6 is a top view of the movable contact arm shown in FIG. 5;

FIG. 7 is a front view of the movable contact arm shown in FIG. 5;

FIG. 8 is an enlarged, sectional view of the insulator bobbin and a part of its supporting magnetic frame, the turns of wire being omitted;

FIG. 9 is a greatly enlarged, perspective view of the latch of the toggle assembly mechanism shown in FIGS. 1 to 3;

FIG. 10 is an end view of the latch shown in FIG. 9, the lock shaft being shown in full lines prior to assembly with the drive link and in dot-dash lines after assembly therewith, this view also being greatly enlarged relative to FIGS. 1 to 3;

FIG. 11 is an enlarged, side elevation view of the toggle mechanism illustrated in FIGS. 1 to 3, illustrating the latched position;

FIG. 12 is a sectional view taken along the line 12—12 in FIG. 11, but showing the latch in end elevation;

FIG. 13 is a further enlarged partial, sectional view of the toggle mechanism and is taken along the line 13—13 in FIG. 12, showing the catch link latched with the lock shaft;

FIG. 14 is a sectional view taken along the line 14—14 in FIG. 2, but illustrating the internal parts in end elevation and after assembly within the two half-cases;

FIG. 15 is an enlarged elevation view of the coil of the electromagnetic tripping device shown in FIGS. 1 to 3, but showing the back of the coil, as viewed, for instance, in FIG. 1, and a part of the magnetic frame;

FIGS. 16 and 17 are top and bottom views, respectively, taken along the lines 16—16 and 17—17 in FIG. 15; and FIG. 18 is a perspective, enlarged view of the armature shown in FIGS. 1 to 3, but viewing the armature after rotating it about 90° counterclockwise from the position shown in FIG. 1 and viewing the armature from the top and the back, relative to FIG. 1.

Referring to the drawings, the circuit breaker 10 comprises an insulating case 12, preferably molded from a plastic material, divided into two juxtaposed, approximately half-cases 14 and 16. The circuit breaker 10 includes and automatically resettable linkage mechanism 18 which is mounted within and enclosed by the case 12, but for a part of a handle 19 which extends out of the case 12, as shown. Preferably the handle is formed of a suitable plastic insulator, such as nylon.

The mechanism 18 comprises a movable contact 20 carried by a movable arm 21 and engageable with a stationary contact 22, the latter being carried by a support conductor 23 forming part of a terminal 24. The movable arm 21 is connected by a flexible conductor 26 to one end of a coil 30 forming part of an electromagnetic device 32 which is also enclosed by the case 12 and which is associated with the linkage mechanism 18 to trip open the contacts on predetermined overloads. The electrical circuit of the circuit breaker is completed by connecting the other end of the coil 30 to a terminal 36. As shown, the terminals 24 and 36 are carried by the case 12 and extend outwardly therefrom.

Further, the movable arm 21 is biased by a spring 38 toward the open position of the contacts 20 and 22 and the movable arm 21 is mounted on a pin 39 about which it pivots, the pin 39 having end portions 33 carried by two spaced plates 34 and 35 (FIGS. 1 and 14) forming a frame 41, only the plate 34 being shown in FIG. 1. The movable arm 21 is also connected by a pin 42 to a toggle assembly or latching mechanism 44, the latter being in turn connected to the depending handle link 49 (integral with the handle 19) by a pin 45. The handle 19 pivots about a pin 46 having end portions 47 also carried by the spaced plates 34 and 35.

The movable contact arm 21 also carries a stop pin 40 (against which the loop of the spring 38 rests, see FIG. 14), the end portions of the pin 40 limiting opening movement of the arm 21 by abutting with the plates 34 and 35, as shown in FIGS. 2 and 3.

The frame plates 34 and 35 are integral with an L-shaped magnetic frame 41 comprising a horizontal leg 230 and a vertical leg 231. The frame 41 forms part of the electromagnetic device 32 to which is secured a time delay tube 43 housing a spring biased magnetizable core (not illustrated) movable against the retarding action of a suitable fluid to provide a time delay before tripping of the mechanism at certain overloads. As illustrated, the horizontal frame leg 230 also carries the coil 30 comprising an insulator spool or bobbin 240 and multiple turns of insulated wire 48.

The operation of this type of linkage mechanism 18 and electromagnetic device 32 is generally set forth in Pat. No. 2,360,922, among others, but for clarity's sake may be briefly described as follows—when the handle 19 is rotated clockwise, as viewed in FIG. 2, the toggle mechanism 44 and the movable arm 21 all move down, against the bias of the spring 38, and move the contact 20 into engagement with the contact 22, the contact assuming the closed position which is illustrated in FIG. 1.

Upon the occurrence of a predetermined overload condition, assuming the circuit breaker to be in the contacts closed position, not illustrated, the armature 50 (which is also part of the electromagnetic device 32) is attracted toward the pole piece 52 either after a time delay period or virtually instantaneously, depending on the overload current. The armature 50 pivots toward the pole piece 52, about a pin 54 whose end portions are also carried by the space frame plates 34 and 35 and which carries the armature 50, causing the oppositely extending trip member 56 (which is integral with the armature 50) to pivot to the right and to trip the arm 150 forming part of a latch assembly 126 which, when the toggle mechanism 44 has been moved to the contacts closed position, is juxtaposed with the trip member 56 (as shown in FIG. 1), whereupon the toggle mechanism 44 collapses under the pressure of opening spring 38.

To minimize and/or extinguish any arc that may form between the contacts 20 and 22 whenever the contacts are opened, assuming the circuit breaker to be energized, a stacked array of three magnetizable, metal grids 70, 71 and 72 are supported within and by the two half-cases 14 and 16, and above the support conductor 23 and the stationary contact 22 as set forth in greater detail in copending patent application Ser. No. 535,271, filed Jan. 28, 1966.

The half-cases 14 and 16 comprise, respectively, side walls 80 and 81 and peripheral, marginal upper walls 82 and 83, bottom walls 84 and 85, end walls facing the grids 70, 71 and 72, and end walls facing the coil 30 defining a cavity 90 within which is placed the linkage mechanism 18 and the electromagnetic device 32. The side walls 80 and 81, however, also have inwardly projecting walls which separate the cavity 90 into a main cavity 96 and an arcing chamber 97.

As seen in FIGS. 4 and 14 the handle 19 is supported intermediate the frame plates 34 and 35 by the pin 46 which is slidably received both in a hole in the handle 19 and in suitable holes in the frame plates. The opposite end portions 47 of the pin 46 are received in bosses 100 projecting inwardly from the side walls 80 and 81. Further, as seen in FIG. 14, the end portions 33 extend beyond the frame plates 34 and 35 and are received in bosses 102. Thus, the pin end portions 33 and 47 support the electromagnetic device 32 and the linkage mechanism within the case, and the abutment of the frame plates with the opposed faces of the bosses 100 and 102 spaces the electromagnetic device 32 and the linkage mechanism 18 laterally.

The handle link 49 has a side face 104 formed with a projecting annular boss 106 coaxial with the hole through which the pin 46 extends, the boss 106 abutting the frame plate 35, as shown in FIG. 4. The side face 108 of the handle link 49 is recessed and receives a part of a coil torsion spring 110 carried by the pin 46 between the frame plate 34 and the handle link 49. As shown in FIGS. 1, 2 and 4, the spring 110 has one end portion 112 bent and hooked around the frame plate 34. The other end portion 114 of the spring 110 rests against the recessed portion of the surface 108 and also rests against the pin 45, the spring 110 being stressed at all times so as to bias the handle counterclockwise, as illustrated in FIGS. 1, 2 and 3, i.e., toward the contacts open position, and toward the right, as viewed in FIG. 4, so as to urge the boss 106 into contact with the frame plate 35 to provide positive seating of the handle link relative to the frame plates and more accurate spacing of the toggle mechanism 44 and the movable contact arm 21. After tripping of the latch 126 by the armature 50, the handle spring 110 automatically relatches the toggle links 120 and 122 in the overcenter position shown in FIGS. 2 and 11 and automatically moves the handle 19 to the contacts open position.

The lower part of the handle link 49 is provided with a hole which slidably receives the pin 45 and is bifurcated to receive the upper part of a catch link 120 the pin 45 extending, slidably also, in a hole in the catch link.

The catch link 120 with a U-shaped link 122, so named because, when viewed in cross-section (FIG. 12), it has an inverted U-shape, comprise the two toggle links of the toggle mechanism 44, and are pivotally connected together by a rivet 124 having an enlarged head at one end which is peened over at the other end to pivotally secure the two links together.

The U-shaped link 122 carries a latch or lock assembly 126 which includes a two-piece drive link 127 and a lock shaft 128. The lock shaft 128 has a half-moon like central portion 130, between the two legs of the U-shaped link 122, the half-moon 130 being engaged by a tooth 132 formed on the catch link 120, half-moon 130 being disposed between two opposed surfaces 134.

The drive link 127 is initially separate from the lock shaft 128 and is preferably a zinc die casting. The lock shaft 128 has a left hand end 136, of smaller diameter than the remainder, thus defining a shoulder 137, the left hand end being pressed into a hole in the drive link and peened over to secure the lock shaft 128 to the drive link 127.

Coiled about the left cylindrical land 140 of the lock shaft 136 is a coil spring 142, the spring 142 having an end portion 144 hooked over one leg of the U-shaped catch link 120 and the other end portion 146 resting against the arm 148, the spring 142 being stressed at all times so as to bias the lock assembly 126 clockwise, as viewed in FIG. 11, tending to always bring the half-moon 130 into engagement with the tooth 132, and biasing the lock assembly 126 axially to the left, as viewed in FIG. 12.

The drive link 127 further has an arm 150, extending axially along the same axis as the arm 148 but on the other side of the central, generally triangular section 152 being engaged by the armature trip member upon the occurrence of predetermined overloads to collapse the linkage mechanism and open the contacts.

The arms 148 and 150 are formed integral with and at one end of the central section 152 and at the other end the section 152 has an integral arcuate portion 154. The arcuate portion 154 overhangs the spring 142, as shown in FIG. 12, on the right hand side of the central section, and tends to balance the lock assembly 126 about the longitudinal axis of the lock shaft 128, about which the lock assembly pivots. The part of the arcuate portion 154 which overhangs the spring 142 protects it from flying beads of metal which may form during arcing of the contact.

While the arcuate portion 154 has been shown also overhanging the central section 152 on the left, as viewed in FIGS. 10 and 12, for example, it is seen that if interference with the movement of the armature member 56 should result because of this overhang that such overhang may be removed.

The lock shaft 128 is mounted by the aforementioned circular land 140 and by a right hand land 156, FIG. 12, in aligned holes in the U-shaped link 122 and would be freely movable axially, but for the part of the catch link 120 which is received at all times between the opposed surfaces 134 and which prevents such free movement.

As illustrated in FIGS. 12 and 13, the leg of the U-shaped link 122 closest to the drive link 127 has a window 160 through which the arm 148 extends. Clockwise movement of the lock assembly is limited by abutment of the arm 148 with the stop surface 161 and counterclockwise movement (to the dot-dash position in FIG. 11) by the restraint from the end 146 of the coil torsion spring 142.

The lock shaft 128 is turned on a lathe or other suitable machine and is perferably made from stainless steel. A slot 164 is ground or slit into the otherwise cylindrical lock shaft to form the half-moon 130 and the surfaces 134. This grinding or slitting may create burrs at the upper ends 168 of the arcuate edges of the surfaces 134, as viewed in FIGS. 9, 10 and 13, or at the opposite ends 169 of surface 166.

The catch link 120 is formed with generally triangular swells 170 on opposite sides, as shown, extending around the hole for the rivet 124 and down to the area of the tooth 132 and as far up and to the left, FIG. 11, as is required for the contemplated pivoting of the catch link 120 about the rivet 124 in moving to the trip free position, FIG. 3, and the catch link is preferably a sintered stainless steel. The catch link 120 thus has a peripheral margin 172 in which the tooth 132 is formed and which extends away from the tooth on opposite sides, as shown, the margin 172 being wider, just opposite the tooth, as shown in FIG. 13. The surfaces 134 are spaced apart sufficiently to permit the thickest part of the catch link to be freely received between them. However, the thickness of the catch link 120, because of the margin 172, is substantially less than the thickness measured across the swells 170, and, of course, less than the distance between surfaces 134. Thus, as the catch link 120 shifts along the pin 45 and along the rivet 124, the parts of the swells 170 on one side or the other of the catch link 120 which extend toward the surface 166 (FIG. 13) will engage one or the other of the surfaces 134, resulting in the sides of the tooth 132 being spaced from any burrs on the upper ends 168 of the side walls 134, FIGS. 12 and 13.

As mentioned, the margin 172 is notched or recessed at 173, just to the right of the tooth 132, as shown in FIG. 13, to receive any burr that may be formed on the upper end 169 which contacts the tooth 132, so as to provide a full bearing surface of the tooth 132 on the arcuate surface of the half-moon, i.e., any burr at this end would otherwise tend to prevent the full counterclockwise seating of the half-moon 130 shown in FIG. 13, and so as to do away with a fillet which would otherwise probably be formed between the tooth 132 and the surface 175.

Axial movement of the lock shaft 130 to the right, as viewed in FIG. 12, is restricted by the right hand side of the arcuate portion 154 which would engage the left leg of the U-shaped link 122. Normally, however, the spring 142 biases the drive link 127 to the left, as viewed in FIG. 12, moving the right hand surface of the arcuate portion 154 slightly out of engagement with the U-shaped link 122, the movement of the lock shaft 130 being restrained by the catch link 120.

Thus, a smooth operation of the tooth 132 and of the half-moon 130 is assured.

Also, since the lock shaft 128 is freely movable axially to the left, as viewed in FIG. 12, but for the engagement of the right hand surface 134 with the catch link 120, if the swells 170, on both sides of the catch link, are made sufficiently thicker above the dot-dash line shown in FIG. 13, together with a sufficiently wide land 140, the left swell above the dot-dash line will engage, for instance, the left leg of the U-link 122 before any part of the half-moon 130 can enter the hole (in the left leg of the U-shaped link 122) for the lock shaft 130. The prevention of entry of the half-moon 130 into the hole for the lock shaft 128, is desirable because otherwise the burrs on the edges 169 would tend to bite into the U-shaped link 122, which might cause erratic operation of the latch assembly 126.

The movable contact arm 21, as shown in FIG. 5, comprises a major flat portion 179 and a bent, minor portion 182, the arm 21 being bent from a piece of substantially flat sheet metal with suitable electrical conducting characteristics, i.e., a copper or copper-base material. The flexible conductor 26 (FIG. 1) is welded to the rear portion of the movable arm 21, as shown.

The major portion 179 of the movable arm 21 has a hole slidably receiving the rivet 42 which pivotally connects the lower end of the U-shaped link 122 to the movable arm and another hole which receives the stop pin 40. The major portion 179 of the movable arm also has (at its rear end portion) an arcuate slot through which extends the pin 39.

The minor portion 182 of the movable arm 21 is bent at substantially a right angle to the remainder of the movable arm and includes a forward contact carrying section 183 with a hole which receives a lug 184, the lug 184 being integral with the movable contact 20. The lug extends through the carrying section 183 and is peened over so as to secure the movable contact thereto, the movable contact being in abutment with the underside of the carrying section 183, as shown in FIGS. 5, 6 and 7. The movable contact 20 is circular, as shown, and while being slightly smaller in diameter than the width of the carrying section 183, as best shown in FIG. 6, the contact 20 essentially occupies all of the surface of carrying section 183, as shown.

Further, the minor portion 182 includes a rear extension 185, as shown in FIGS. 5 and 6, to provide a heat sink, in close proximity to the contact 20 and integral with the contact carrying section 183.

The forward portion 182 is also bent, as shown in FIG. 7, to the left, so as to place the contact 21 and the contact carrying section 183 straddling, substantially evenly, the longitudinal axis of the movable arm 21, the center of the contact 20 being substantially in the plane of the central plane through the major portion of the arm 21 when viewed on end, as in FIG. 7.

Thus, a space 181 is defined between the major portion 179 and the minor portion 182 into which a part of the catch link 120 may enter, as shown in FIG. 3, when the linkage mechanism is in the trip-free position, i.e., the handle 19 is held in the contacts closed position but the contacts are actually opened, because the conditions in the circuit to which the circuit breaker is connected are such as to trip the circuit breaker, either instantaneously or after a time delay period, in FIG. 3 the armature being shown before it is automatically returned to the positions shown in FIG. 1 or 2.

Referring to FIG. 18, the armature 50 comprises the aforementioned tripping leg 56, an attracted leg 200, a third leg 202 tending to balance the armature and a serrated leg 204, all of the legs being integral and connected by a bridge 206 having ears 207.

Suitable aligned holes 208 are formed in the ears 207 and aligned holes are formed in the frame plates 34 and 35, all the holes slidably receiving the pin 54.

The holes for the pin 54 in the plates 34 and 35 are formed in the center of circular bosses 210 which are pressed toward each other, as shown in FIG. 4.

The ears 207 are received between the bosses 210 and the raised surfaces of the bosses provide bearing surfaces keeping the armature legs 56, 204, and 206 spaced from the remainder of the frame plates 34 and 35.

The serrated leg 204 is offset, toward the legs 56 and 202, at its outer arcuate portion, to further reduce the possibility of interference of this leg with the frame plate 35, and the lower left hand section, in FIG. 18, is adapted to abut with the vertical leg 231 of the frame to limit counterclockwise rotation of the armature 50.

Note that, as illustrated in FIG. 14, the toggle assembly is received between the serrated leg 204 on the one side and the tripping leg 56 and leg 202 on the other side, and the legs 56, 202, and 204 are received between the frame plates 34 and 35.

The pin 54 carries a coil torsion spring 216 between the ears 207, the spring 216 having one end 217 hooked over the frame plate 34 and the other end 218 hooked over and caught between two of the teeth of the serrated leg 204. The spring 216 biases the armature 50 in the clockwise direction, i.e., the attracted end 200 is biased away from the pole piece 52.

The frame plates 34 and 35 are integral with the L-shaped frame 41 of magnetizable material, the frame 41 having a lower leg 230 having a tubular, upstanding hollow section 232. The inner surface of the tubular section is cylindrical and slidably receives the time delay tube 43 which is preferably of non-magnetic material and which houses the movable core of magnetic material which is biased to the lower end of the tube by a spring and which is movable upwardly, when the coil 30 is sufficiently energized, against the retarding action of a suitable fluid, toward the magnetic pole piece 52.

The tubular section 232 is made by a drawing operation from the leg 230, and has an outer surface which is uniformly tapered from a larger diameter adjacent the juncture of the tubular section 232 with the leg 230 to a smaller diameter at the top of the tubular section 232.

The coil 30 comprises an insulator bobbin or spool 240, preferably molded from nylon, having an upper end flange 242 and a lower end flange 244 seated upon the leg 230, the flanges 242 and 244 being connected by a hollow tubular section 246. The inner and outer surfaces of the tubular section 246 both have a larger diameter adjacent the lower flange 244 and a smaller diameter adjacent the upper flange 242, tapering in toward the tube 43 with the inner surface at the upper end of the tubular section 246 making a sliding fit with, or being slightly spaced from, the tube 43, and the inner surface at the lower end making a sliding fit with, or being slightly spaced from, the tubular section 232, the taper angle of the outer surface of the tubular section 232 and of the tubular section 246 being approximately the same.

The lower portion of the inner surface of the tubular section 246 makes a sliding fit with, or is slightly spaced from, the magnetic tubular section 232, as illustrated.

Thus, the annular volume of the spool receiving the turns of wire 48 (FIG. 15) is increased at the upper end portion (FIG. 8) as compared to the lower end portion.

As seen in FIG. 16, the upper flange 242 has a generally circular shape that is formed with a flat ended projection 262 extending toward the vertical leg 231 of the frame 41 to define therebetween a small space 260. Since the bobbin 240 sits loosely on the leg 230, any tendency of the bobbin to rotate relative to the frame 41 is prevented by abutment of the projection 262 with the vertical leg 231. The projection 262 may actually be made large enough to engage the leg 231 and bias the upper end of the bobbin away therefrom so as to keep the wire turns away from the leg 231. At the other side, of the flange 242, projection ears 264 are formed having holes 266, as shown, the top of the ears being recessed as shown in FIGS. 15 and 16. The function of the holes 266 is to receive the end portion of the last turn of small diameter wire carried by the bobbin 240, the wire end portion being knotted to one or both ears, as desired, but this knotting is not illustrated the recessing being sufficient to accommodate the diameter of the wire with clearance between the wire and the adjacent part of the case, even though the wire may extend beyond the upper surface of the flange 242, FIG. 12. When the wire is of substantial diameter, as shown in FIG. 15, the holes 266 are not used as the wire has sufficient rigidity not to unravel. With small diameter wire, the tendency is for the last few turns to unravel, as they are sufficiently rigid, and previously they have had to be taped in place. By threading the end wire portion through one or both holes 266 and knotting the end wire portion to one or both ears 264, this taping operation is eliminated, and more turns of wire may be placed on the bobbin as no space need be allowed for the tape.

The lower flange 244 also has a generally circular shape but is segmented to form a flat surface 256 spaced from the vertical leg of the frame 41. The cutback surface 256 has the advantage of avoiding interference between the flange 244 and the bend between the legs 230 and 231. The other side of the flange 244 is also segmented, as shown, to provide a flat surface 258 extending beyond the segmented face of the frame leg 230 to clear the adjacent part of the terminal 36. As shown in FIG. 17, the lower flange 244 extends beyond the leg 230 on three sides.

To also minimize the rotation of the bobbin 240 relative to the magnetic frame 41, the lower flange 244 is provided with a depending lip 252, FIG. 15, having a generally U-shape, as shown in FIG. 17, the lip 252 being integral with the flange 244. The lip 252 is received in a notch 250, as shown in FIG. 17, the notch 250 also having generally a U-shape except that the left leg is very short as the width of the leg 230 is smaller on the left, as it approaches the vertical leg of the frame 41. Any tendency of the bobbin to rotate relative to the leg 230 will cause engagement of the lip 252 with the leg 230 and restrain such rotation.

Further, the end portion of the first turn of wire 48 is placed through the passage formed by the lip 252, to further insulate the wire 48 from the metal leg 230.

To assemble the coil 30, the frame 41 and the tube 43 together, the coil is placed upon the leg 230, the tube 43 is inserted into the tubular section 232 with its lowest end going in first, as its diameter is smaller than that of the pole piece 52, and then the tube 43 is soldered to the leg 230, as shown in FIG. 8.

Comparing FIGS. 16 and 17 it is seen that the horizontal, radial dimension from the center of the flange 242 to the extremity of the projection 262 is larger than the radial dimension of the flange 244. (Further, as noted, depending on manufacturing tolerances, the projection 262 may actually contact the vertical frame leg and bias the bobbin away from it, in which event no space 260 would exist.) The provision of the projection 262 may, in some instances, do away with having to wrap the outer layer of the wire turns with insulating tape.

The abutment of the arm 148 with the surface 161, FIG. 11, causes a small space to exist between the surface 175 and the surface 166, FIG. 13. If the position of the surface 175 is closely controlled relative to the tooth 132 it would be possible to limit rotation of the lock shaft 128 by abutment of the surface 166 with the surface 175, thus eliminating the need for the arm 148 to abut the shaft surface 161.

Note that when the contacts are moved to the closed position the ends of pin 45 abut the frame plates 34 and 35 to limit overcenter travel of the toggle formed by the handle link 49 and the catch link 120.

During manual operation of the handle 19 it may be possible at certain times for the toggle links 120 and 122 to move so that the knee pin 124 attempts to move to the left of a line connecting the centers of the pins 42 and 45, i.e., through center, as viewed in FIG. 11, and this movement is prevented by the upper right hand base portion of the U-shaped link 122 coming into engagement with a raised local stop surface 165 projecting on the right hand side of the catch link, as shown, which is accurately positioned relative to the holes in the catch link for the pin 45 and the rivet 124.

Having described the invention, what I claim is:

1. In a circuit breaker comprising a case, an automatically resettable linkage mechanism enclosed by said case but for a part of a handle which extends through said case, said mechanism including a movable arm carrying a movable contact, a stationary contact mounted within said case and carried by a first terminal, said stationary contact being engageable by said movable contact, an electromagnetic device for tripping said mechanism on predetermined overloads, said electromagnetic device including a coil connected at one end to said movable arm and at the other end to a second terminal, said electromagnetic device having a magnetic frame forming spaced first and second plates which carry said mechanism, the combination of a resetting coil spring biasing said handle to the contacts open position at all times, said handle having a first side recessed to receive a part of said spring, a pin supported by said plates and about which said handle pivots, said spring being carried by said pin between said first plate and said first side, said handle having a second side opposite to the first side and formed with a projecting boss, said boss being biased axially against said second plate by the coils of said spring, said spring having a first end portion hooked over said first plate and a second end portion in said recess and in engagement with a part of said handle to always bias said handle in the contacts open position.

2. In a circuit breaker comprising a case, an automatically resettable linkage mechanism enclosed by said case but for a part of a handle which extends through said case, said mechanism including a movable arm carrying a movable contact, a stationary contact mounted within said case and carried by a first terminal, said stationary contact being engageable by said movable contact, an electromagnetic device for tripping said mechanism on predetermined overloads, said electromagnetic device including a coil connected at one end to said movable arm and at the other end to a second terminal, said electromagnetic device having a magnetic frame forming spaced first and second plates which carry said mechanism, said mechanism including a toggle assembly comprising a catch link, a carrier link and a latch carried by said toggle carrier link to latch said links in an overcenter toggle position, the improved latch comprising a lock shaft and a drive link, said drive link having arms at one end to be tripped by said electromagnetic device and for engagement with said carrier link to limit pivotal motion of said latch, a latch reset coil spring always biasing said lock shaft into latching engagement with said catch link, said latch reset coil spring being carried by said lock shaft between said drive link and said carrier link, said latch reset coil spring having one end hooked onto said carrier link and the other engaging one of said arms, said drive link having an arcuate portion overhanging said latch reset coil spring to protect said latch reset coil spring and tend to balance said latch about the longitudinal axis of said lock shaft.

3. The structure recited in claim 2 wherein said catch link has a tooth engaged by said lock shaft, said catch link has swells on opposite sides so as to provide a thickness which is greater than the thickness of said tooth and a peripheral margin in a portion of which said tooth is formed, said lock shaft having opposed surfaces defining a slot receiving a part of said catch link, whereby burrs at the opposite ends of said surfaces are received in the recesses formed between said peripheral margin and said swells, rather than cutting into said catch link.

4. The structure recited in claim 3 wherein said lock shaft has a half-moon portion which engages said tooth, said half-moon portion having an outer, curved surface and an inner surface, said catch link is notched directly inwardly of said tooth and adjacent thereto to receive any burr that may exist on said lock shaft at the juncture of said curved surface and said inner surface.

5. The structure recited in claim 3 wherein said peripheral margin is wide enough, when the catch link is engaged by said lock shaft, so that no part of the swells are received between the opposed surfaces defining said slot, said lock shaft has opposed circular lands on opposite sides of said slot, said lands being carried by holes in said carrier link, said lands being wide enough and said swells being thick enough relative to said peripheral margin to engage said carrier link, as said lock shaft shifts axially, before said slot enters said holes in said carrier link, so that any burrs on said lock shaft will not dig into the carrier link.

6. In a circuit breaker comprising a case, an automatically resettable linkage mechanism enclosed by said case but for a part of a handle which extends through said case, said mechanism including a movable arm carrying a movable contact, a stationary contact mounted within said case and carried by a first terminal, said stationary contact being engageable by said movable contact, an electromagnetic device for tripping said mechanism on predetermined overloads, said electromagnetic device including a coil connected at one end to said movable arm and at the other end to a second terminal, said electromagnetic device having a magnetic frame forming spaced first and second plates which carry said mechanism, said movable arm comprising a substantially flat major portion and a minor portion bent at substantially a right angle to said major portion, said minor portion including a contact carrying section centrally aligned with the central plane of said major portion through its thinnest dimension, said minor portion including an integral extension functioning as a heat sink for said contact carrying section together with the remainder of the movable arm, said minor and major portions jointly defining a space receiving a part of said linkage mechanism.

7. The structure recited in claim 6 wherein said contact carrying section has a hole, said movable contact has an integral lug extending through said hole, and a flexible conductor connected directly to said lug and to said coil.

8. In a circuit breaker comprising a case, an automatically resettable linkage mechanism enclosed by said case but for a part of a handle which extends through said case, said mechanism including a movable arm carrying a movable contact, a stationary contact mounted within said case and carried by a first terminal, said stationary contact being engageable by said movable contact, an electromagnetic device for tripping said mechanism on predetermined overloads, said electromagnetic device including a coil connected at one end to said movable arm and at the other end to a second terminal, said electromagnetic device having a magnetic frame forming spaced first and second plates which carry said mechanism, said electromagnetic device including a time delay tube, said coil comprising an insulator bobbin and a plurality of turns of insulated wire, said bobbin being mounted on one leg of said magnetic frame, said frame leg having an upstanding annular section with a uniformly cylindrical inner surface and a tapered outer surface, said bobbin comprising opposed flanges connected by a tubular section, said tubular section having inner and outer tapered surfaces to define a varying volume for the turns of wire along the length of the bobbin, said inner surface of said annular section forming a slip fit with said time delay tube, and said inner surface of said tubular section forming a slip fit with said annular section at one end portion and with said time delay tube at the other end portion.

9. The structure recited in claim 8 wherein the flange of said bobbin which is mounted on one leg of said frame having a lip forming a passage, said leg of said frame on which said bobbin is mounted having a notch receiving said lip, whereby rotation of said bobbin relative to said frame is restrained by engagement of said lip with said leg of said frame upon which said bobbin is mounted, and said lip forming a passage to receive an end portion of the turns of wire and further insulate said end portion from said frame.

10. The structure recited in claim 8 wherein said time delay tube has a pole piece of larger diameter than the remainder of said tube, the flange of said bobbin other than the flange which is mounted on said frame has a projection extending toward one leg of said frame to engage said frame and restrict rotation of said coil relative to said frame and also has a central recess to receive part of said pole piece.

11. In a circuit breaker comprising a case, an automatically resettable linkage mechanism enclosed by said case but for a part of a handle which extends through said case, said mechanism including a movable arm carrying a movable contact, a stationary contact mounted within said case and carried by a first terminal, said stationary contact being engageable by said movable contact, an electromagnetic device for tripping said mechanism on predetermined overloads, said electromagnetic device including a coil connected at one end to said movable arm and at the other end to a second terminal, said electromagnetic device having a magnetic frame forming spaced first and second plates which carry said mechanism, said electromagnetic device including a multi-leg pivotal armature, a pin carried by said plates and carrying said armature, said armature having ears through which said pin extends, said plates have bosses projecting toward each other and toward said ears, whereby said bosses space the armature legs from the remainder of said plates.

12. The structure recited in claim 11 wherein one of said legs has teeth to form a serrated section, said pin carries a coil spring between said ears, said coil spring having one end portion hooked on one of said frame plates and the other end portion caught by the teeth of said serrated section, said coil spring always biasing said armature away from the end of said coil toward which it is attracted when said coil is energized sufficiently on predetermined overloads.

References Cited

UNITED STATES PATENTS

| | | | |
|---|---|---|---|
| 3,056,008 | 9/1962 | Schwartz | 335—38 |
| 3,290,627 | 12/1966 | Davis et al. | 335—9 |

BERNARD A. GILHEANY, *Primary Examiner.*

H. BROOME, *Assistant Examiner.*